US006420866B1

(12) United States Patent
Goldberg et al.

(10) Patent No.: US 6,420,866 B1
(45) Date of Patent: *Jul. 16, 2002

(54) APPARATUS AND METHOD FOR DETECTING METALLIZED CONTAINERS IN CLOSED PACKAGES

(75) Inventors: Ira B. Goldberg, Thousand Oaks, CA (US); David L. Mays, Woodstock, GA (US)

(73) Assignee: Reliance Electric Technologies, LLC, Mayfield Heights, OH (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/159,071

(22) Filed: Sep. 21, 1998

(51) Int. Cl.[7] .................. G01N 27/72; G01R 33/12; B07C 5/00; B07C 5/344
(52) U.S. Cl. .................. 324/234; 324/226; 209/546; 209/567; 361/180
(58) Field of Search .................. 324/207.16, 226, 324/232–239, 243, 260–262, 207.19; 331/65; 209/8, 546, 562, 563, 567, 571, 592; 340/551; 361/180

(56) References Cited

U.S. PATENT DOCUMENTS

| | | | | | |
|---|---|---|---|---|---|
| 2,121,787 A | * | 6/1938 | Dahlgren | .................. | 209/8 |
| 2,819,447 A | * | 1/1958 | Harmon | .................. | 324/236 |
| 2,869,074 A | * | 1/1959 | Clapp | .................. | 324/234 |
| 3,061,775 A | * | 10/1962 | Reznowski | .................. | 324/226 |
| 3,361,962 A | * | 1/1968 | Albrecht | .................. | 324/243 |
| 3,867,283 A | * | 2/1975 | Horn et al. | .................. | 209/592 X |
| 3,893,022 A | * | 7/1975 | Kulik et al. | .................. | 324/236 |
| 3,950,696 A | * | 4/1976 | Miller et al. | .................. | 324/234 |
| 4,038,609 A | * | 7/1977 | Lanberg | .................. | 324/236 X |
| 4,584,529 A | * | 4/1986 | Aoyama | .................. | 324/226 X |
| 4,709,213 A | * | 11/1987 | Podhrasky | .................. | 324/233 X |
| 4,902,997 A | * | 2/1990 | Moran | .................. | 324/239 X |
| 5,304,927 A | * | 4/1994 | Thomas et al. | .................. | 324/239 X |
| 5,689,184 A | * | 11/1997 | Jeffers et al. | .................. | 324/243 |
| 5,929,634 A | * | 7/1999 | Artinger | .................. | 324/233 |
| 5,998,993 A | * | 12/1999 | Inage et al. | .................. | 324/210 |

OTHER PUBLICATIONS

Beech, H.G.; Long Coil System for Fast Sorting of Small Ferro–Magnetic Products, British Journal of NOT, vol. 21, No. 1, pp 44–45, Jan. 1979.*

* cited by examiner

*Primary Examiner*—Gerard R. Strecker
(74) *Attorney, Agent, or Firm*—Craig N. Killen; Alexander M. Gerasimow; William R. Walbrun

(57) ABSTRACT

An apparatus and method used to detect metallized containers or other objects in closed packages traveling in a conveyor stream. The apparatus includes a pair of coil units mounted in association with a packaging conveyor such that the closed packages will pass therebetween. Appropriate field generation circuitry are connected to the coil units for producing a magnetic field. When the metallized containers pass through the magnetic field, the impedance across the coils will vary. The varying impedance is measured continuously, thus giving an indication as to whether the metallized object has been detected. If the package is nonconforming, steps can be taken to automatically remove it from the conveyor stream.

11 Claims, 6 Drawing Sheets

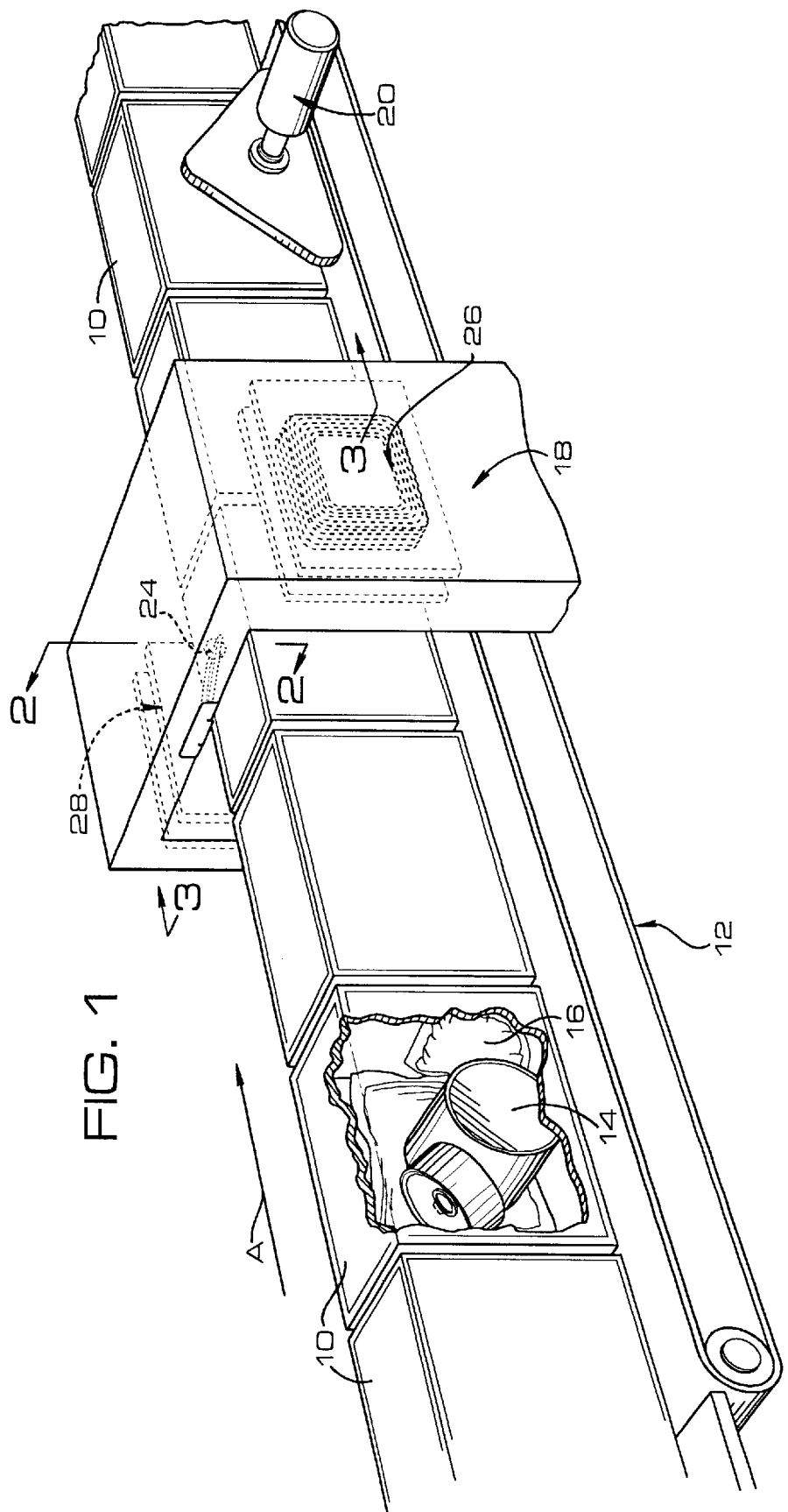

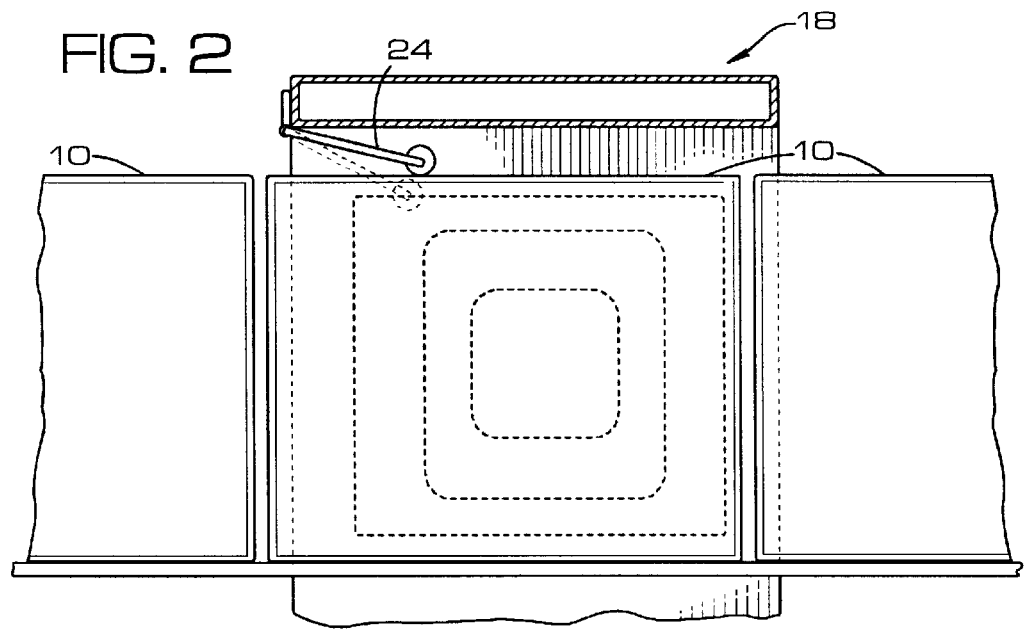
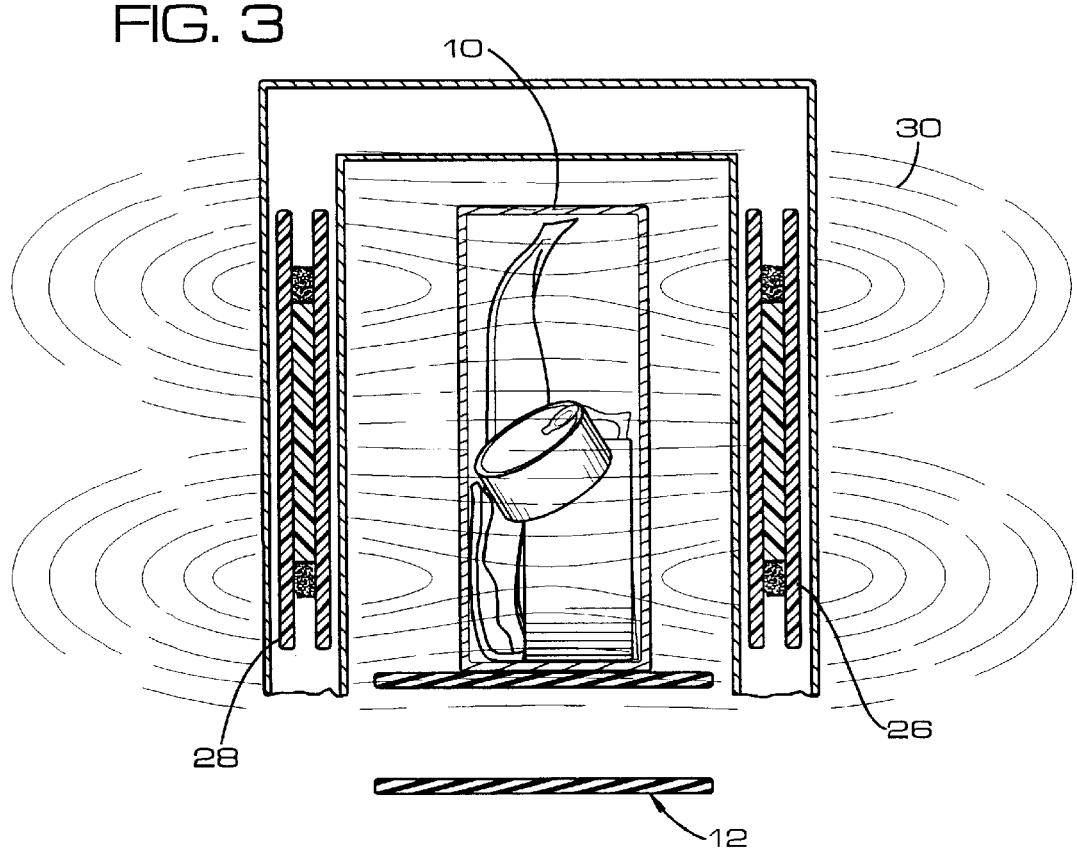

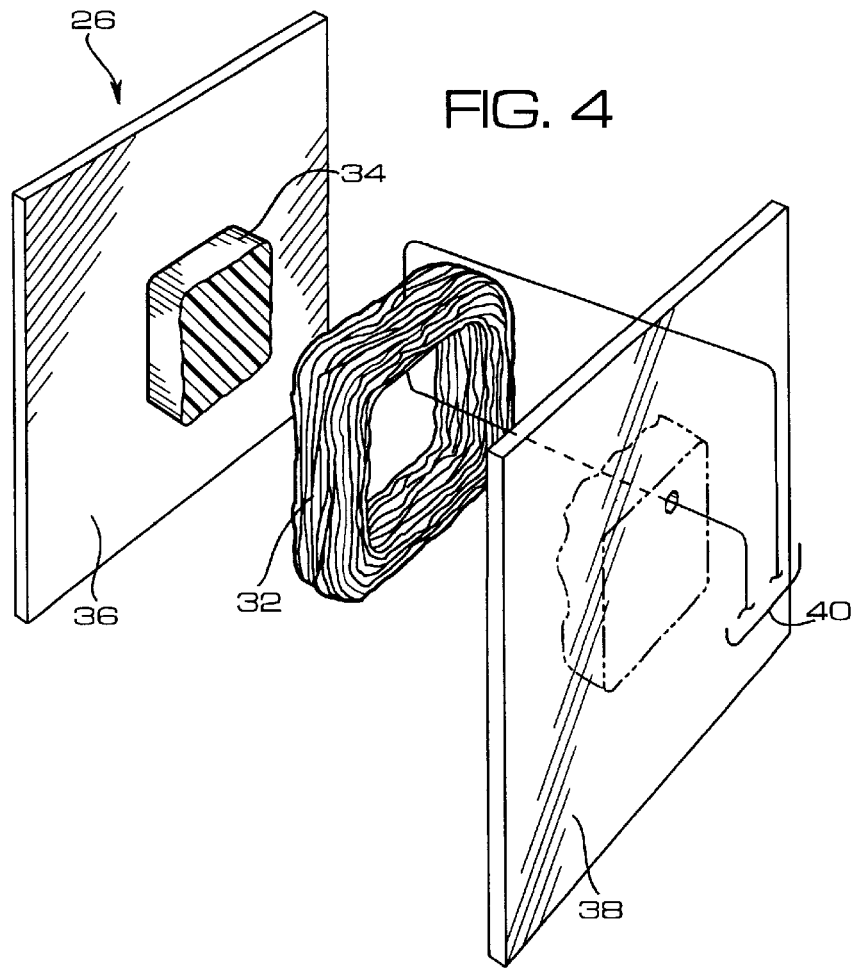
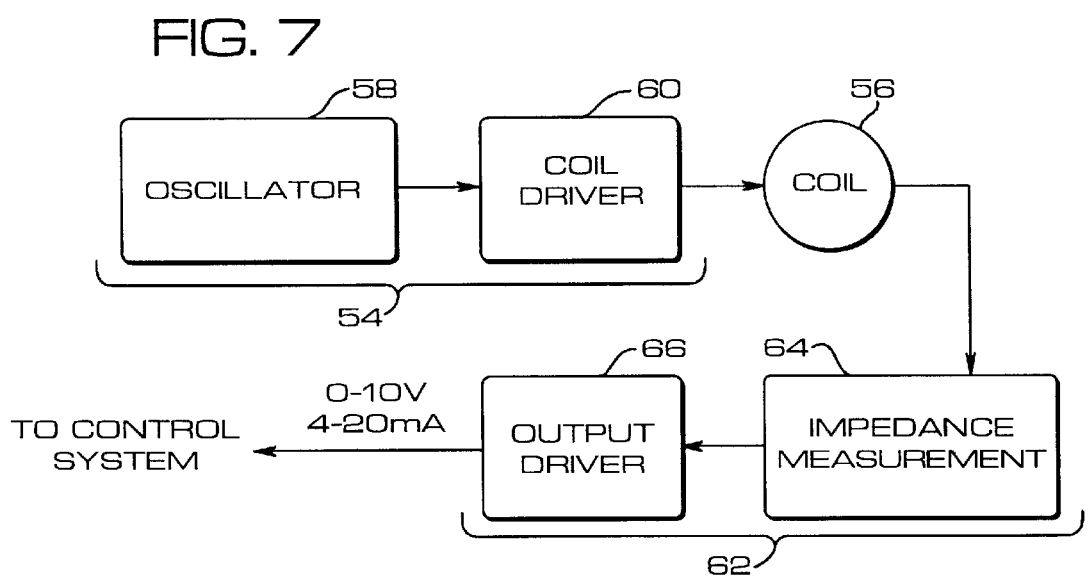

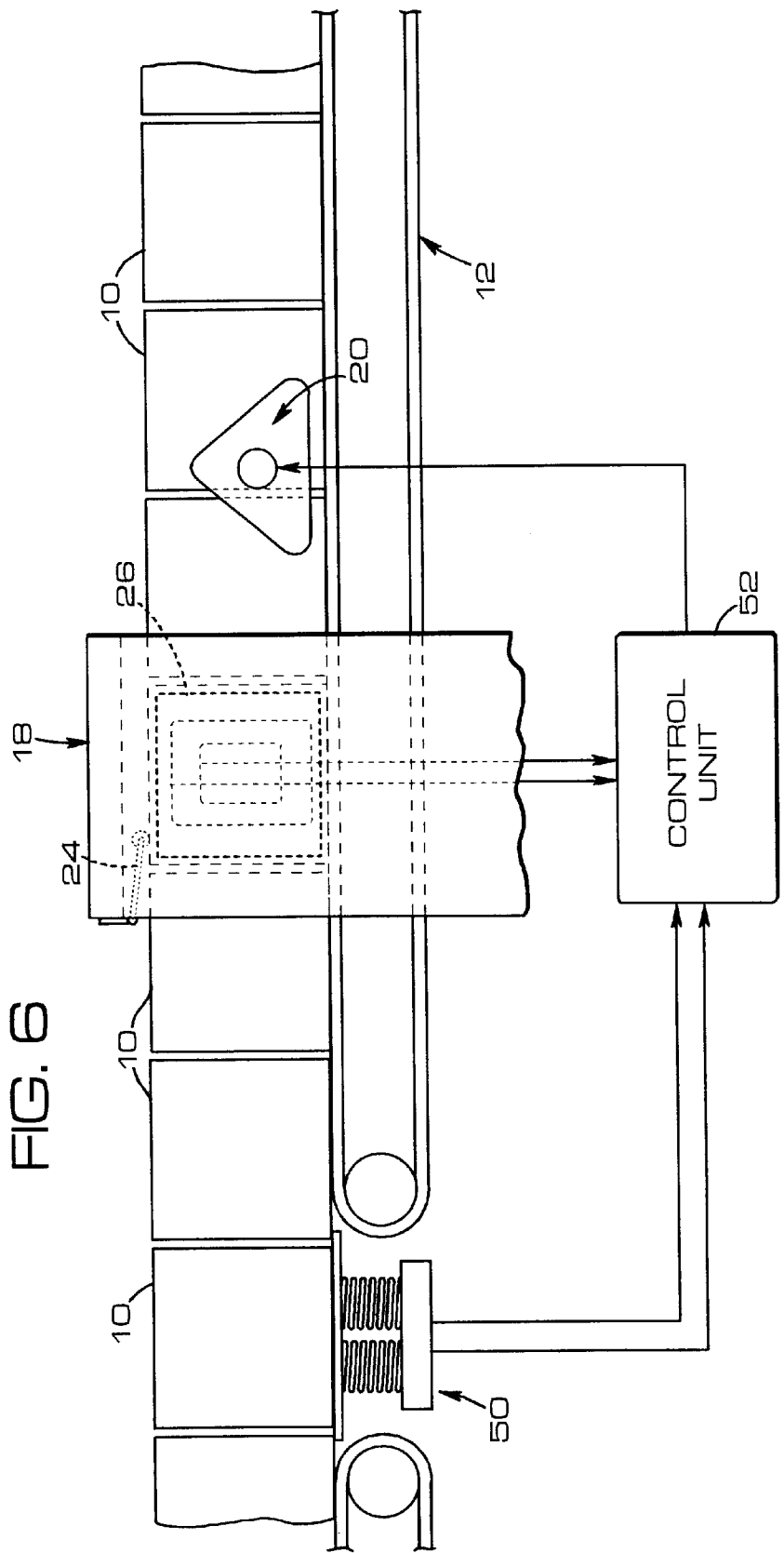

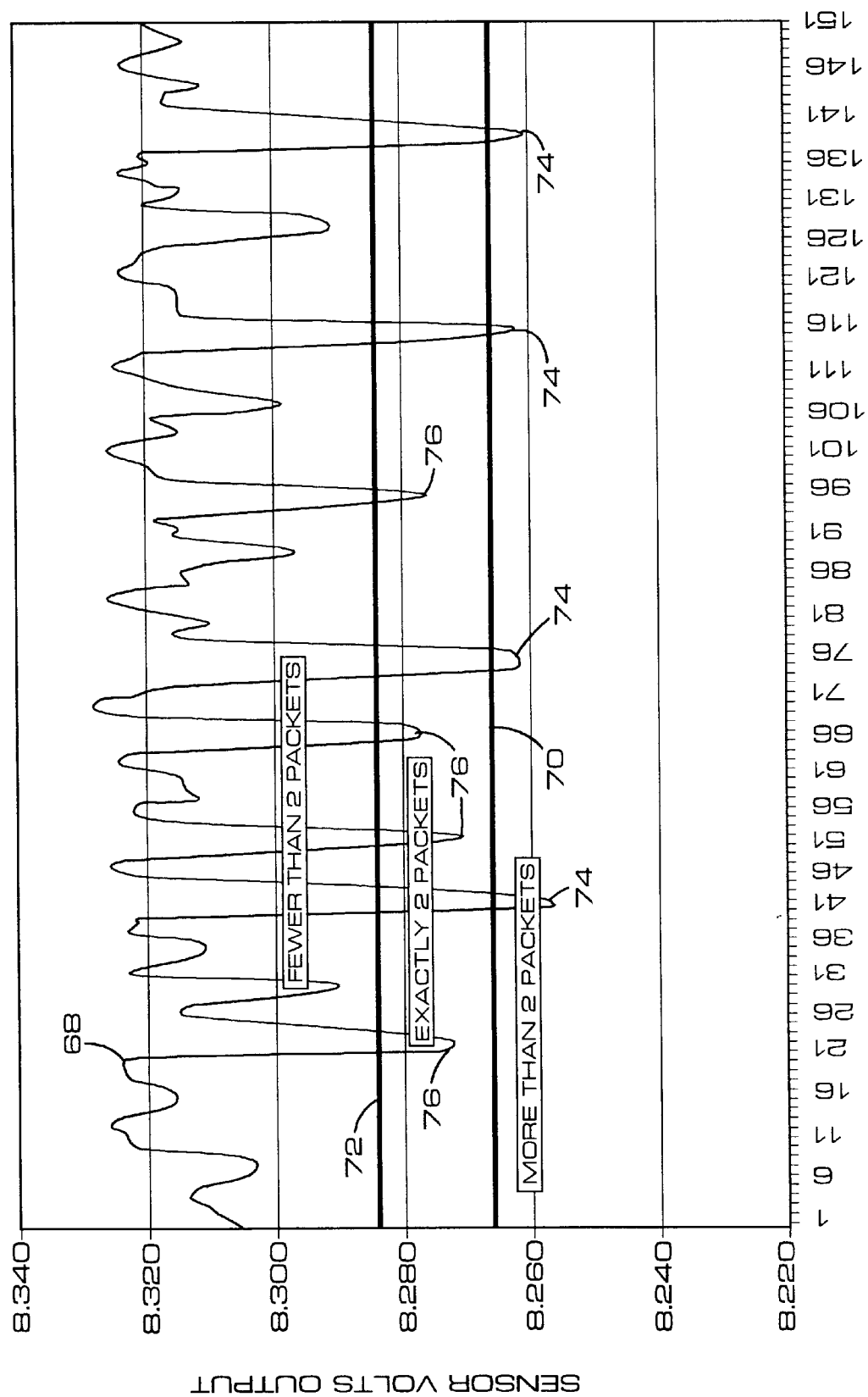

APPARATUS AND METHOD FOR DETECTING METALLIZED CONTAINERS IN CLOSED PACKAGES

BACKGROUND OF THE INVENTION

The present invention relates generally to quality control systems used with packaging conveyors in factory environments. More particularly, the invention relates to an apparatus and method for determining whether a closed package actually contains the desired contents.

In the packaging of dry food products and the like, it is important to determine whether each box contains all of the desired contents. One approach used in industry to address this problem has been to weigh each closed package as it moves past a weighing station on a conveyor. If a particular package weighs less than a known threshold, it is assumed that all of the contents are not present. Appropriate action can then be taken, such as activation of an ejector mechanism to remove the defective product from the conveyor stream.

While prior art weighing systems have been generally effective, they are not without disadvantages. For example, many dry food products, such as rice or pasta, will contain small seasoning packets having a weight less than the variance of the weighing system or the variance of the weight of one or more of the major components in the package. In this case, a weighing system would be unable to distinguish between a package with or without the small packet. In addition, it is often difficult to weigh individual packages that are constantly moving in a high-speed conveyor system. Weighing techniques are also unable to determine the position of the packed contents without opening the package.

SUMMARY OF THE INVENTION

The present invention recognizes and addresses the foregoing disadvantages, and others of prior art constructions and methods. Accordingly, it is an object of the present invention to provide improvements in quality control techniques used with packaging conveyors.

It is a further object of the present invention to provide an apparatus and method for use in detecting the contents of a closed package.

It is an additional object of the present invention to provide an apparatus and method for detecting metallized containers in a closed package.

It is a more particular object of the present invention to provide an apparatus and method for detecting metallized containers in closed packages moving rapidly in a conveyor stream.

Some of these objects are achieved by providing an apparatus used in conjunction with a packaging conveyor to detect metallized objects in respective packages moving along a conveyor stream. The apparatus comprises at least one coil unit mounted in association with the packaging conveyor such that the respective packages pass adjacent thereto. Field generation circuitry is also provided, electrically connected to the coil unit. The field generation circuitry is operative to apply a signal to the coil unit for generating a magnetic field through which the respective packages will pass. Measurement circuitry is operative to measure electrical changes in the coil unit due to the metallized objects and produce an output indicative thereof.

Other objects of the present invention are achieved by a method of detecting metallized objects in a closed package. One step of the method involves generating a magnetic field having a predetermined frequency. Next, the closed package is passed through the magnetic field. A change in the magnetic field due to presence of the metallized object is then detected. An output signal is then produced, indicative of the change in the magnetic field. In exemplary methodology, the output signal may be compared to predetermined levels. The results of the comparison can then be signaled for further use or processing.

Still further objects of the present invention can be achieved by an apparatus for detection of a metallized object in a package. The apparatus comprises a pair of coil units mounted in parallel planes such that the packages can be passed therebetween. Field generation circuitry is also provided, electrically connected to the coil units. The field generation circuitry is operative to apply a signal thereto for generating a magnetic field in a region between the coil units. Measurement circuitry is operative to measure changes in an impedance of the coil units due to the metallized object.

Other objectives, features and aspects of the present invention are provided by various combinations and subcombinations of the disclosed elements, as well as methods of practicing same, which are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which:

FIG. 1 is a perspective view showing an apparatus for detecting metallized objects in a closed package in accordance with the present invention, installed in a packaging conveyor system;

FIG. 2 is an elevational view taken along line 2—2 of FIG. 1;

FIG. 3 is a cross-sectional view taken along line 3—3 of FIG. 1;

FIG. 4 is an exploded view showing the construction of a single coil unit used in the apparatus of FIGS. 1–3;

FIG. 6 is a diagrammatic representation of a packaging conveyor system showing various additional features of the present invention;

FIG. 7 is a block diagram of components of a detection system in accordance with a preferred embodiment of the invention; and FIG. 8 is a graph showing a continuous output of a detection system in accordance with a preferred embodiment of the invention.

Figure 5:
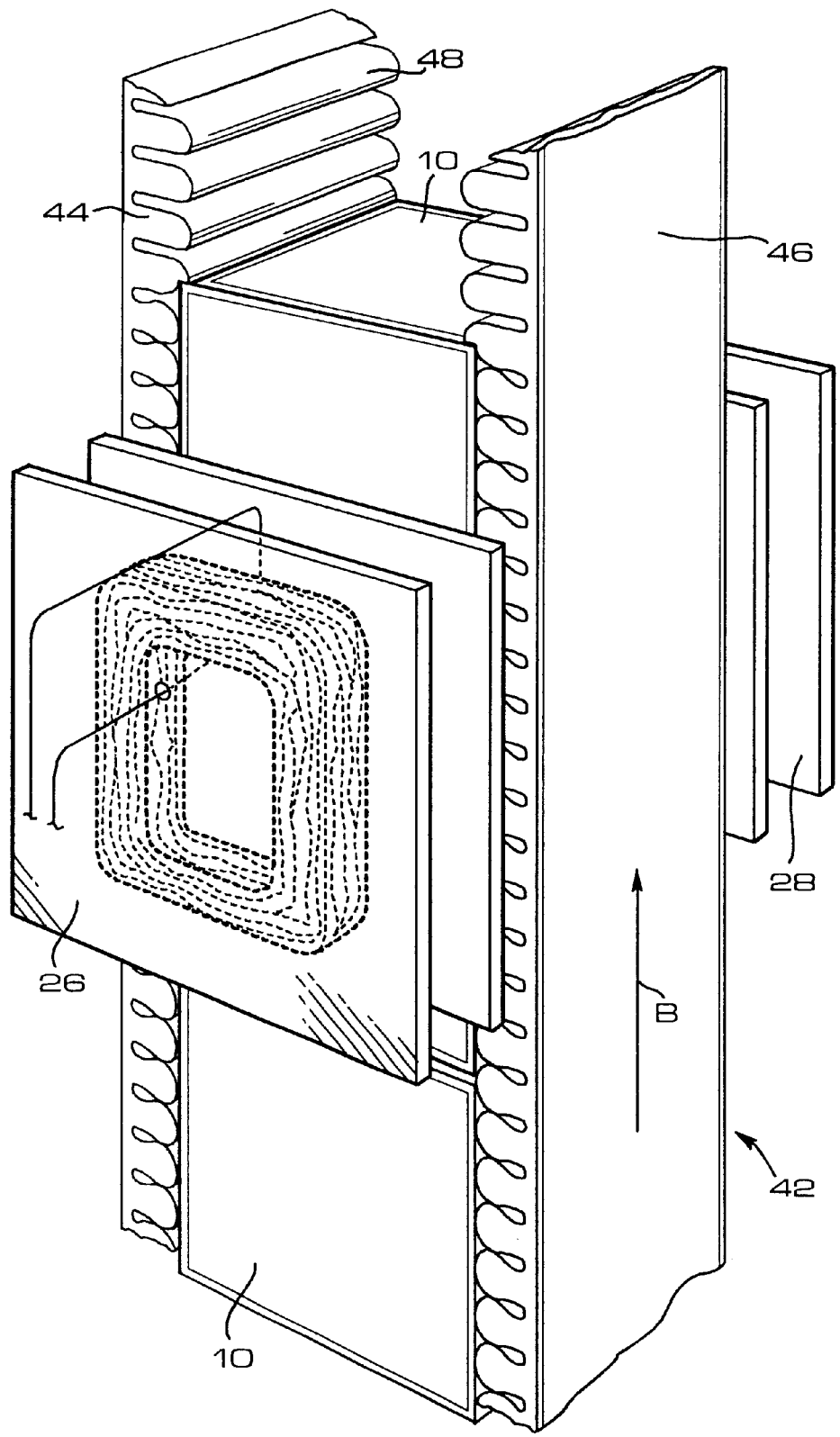
FIG. 5 is a perspective view of a detection apparatus in accordance with the present invention installed in an alternative conveyor system.

Repeat use of reference characters in the present specification and drawings is intended to represent same or analogous features or elements of embodiments of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, even though broader aspects are embodied in the present invention.

FIG. 1 shows a stream of closed packages 10 moving down a conveyor 12 as in a typical factory setting. Often, each of the packages 10 may themselves includes several different types of contents. For example, dry food product such as rice or pasta will often be included within each of the packages 10. Various metallized objects, such as metal cans 14 or foil seasoning packets 16, may also be included.

In order to ensure that adequate quality control standards are met, the conveyor includes an apparatus 18 for detecting whether the desired number of metallized objects are contained within each of the packages 10. As will be described more fully below, packages 10 pass through a magnetic field generated by the apparatus 18 as they move down the conveyor (in the direction indicated by arrow A). The metallized objects cause known fluctuations in the magnetic field, the effects of which can be detected. If a particular package is found to be nonconforming, a suitable ejector mechanism, such as cylinder 20, can be used to remove it from the product stream. In presently preferred embodiments, cylinder 20 may be a fluid-actuated cylinder, such as a hydraulic or pneumatic cylinder mechanism. It should be appreciated, however, that other suitable types of ejector mechanisms, such as magnetically and mechanically actuated cylinders, as well as various types of gates, may also be used to remove nonconforming product.

Referring now also to FIG. 2, apparatus 18 may have a suitable device, such as a roller 24, to determine whether a package 10 is physically present. Roller 24 pivots between a first lowered position and an upper raised position when a package 10 moves into the detection station of apparatus 18. When roller 24 moves in this manner, a signal may be sent to indicate the presence of package 10. One skilled in the art will appreciate that other mechanisms, such as a photoelectric cell, may also be used to signal the presence of an individual package.

As can be seen in FIG. 3, apparatus 18 includes a pair of coil units 26 and 28 between which packages 10 will pass. As shown, the coil units are situated in parallel planes on opposite sides of conveyor 12. Preferably, package 10 will pass approximately centered between coils 26 and 28. As can be seen, coil units 26 and 28 will preferably have a size approximate to the size of packages 10.

In operation, coil units 26 and 28 generate a magnetic field 30 of a predetermined frequency. When the metallic object passes between coil units 26 and 28, eddy currents are generated. The magnetic field produced by the eddy currents opposes the magnetic field produced by the coils 26 and 28. These eddy currents cause a measurable fluctuation in the impedance of coil units 26 and 28. Preferably, sensor electronics continuously measure the coil impedance to determine whether metallic objects have been detected.

The use of two opposed and substantially identical coils in preferred embodiments of the invention will advantageously produce a magnetic field through package 10 that is nearly constant. As such, the output signal from apparatus 18 will show less dependence on the exact position of the package. Prior art metal detectors used by hobbyists, in contrast, have a single coil. These devices provide little information on the size, position or quantity of metallic objects.

Referring to FIG. 4, one exemplary construction of coil unit 26 can be more easily explained. As can be seen, coil unit 26 includes a wire coil 32 wrapped around a core 34. Often, it will be desirable to use a wire of at least 24 gauge, wound about core 34 by no more than about 200 turns. A pair of parallel plates 36 and 38 are situated on each axial end of core 34 to retain the coil 32 in position. Preferably, core 34, as well as plates 36 and 38, will be made from a suitable nonconductive and nonferrous material, such as LEXAN plastic or the like. The respective ends (collectively 40) of wire coil 32 are connected to appropriate circuitry to detect the presence of metal objects in packages 10 as they pass. While only coil unit 26 has been described in detail for purposes of brevity, it will be appreciated that coil unit 28 will be substantially identical.

As used herein, the terms "conveyor" and "conveyor stream" should be construed broadly to include package travel paths generally, in addition to "conveyor belts" of the traditional type. For example, FIG. 5 illustrates an embodiment wherein coil units 26 and 28 are mounted on opposite sides of a vertical conveyor 42. Vertical conveyor 42 moves packages 10 in the direction of arrow B, such that packages 10 pass between coil units 26 and 28. As can be seen, conveyor 42 includes a pair of parallel belts 44 and 46 set apart from each other by a distance slightly less than the width of packages 10. Belts 46 and 48 each have a plurality of deformable nubs, such as deformable nub 48, which thus compress to retain packages 10 securely in position.

FIG. 6 diagrammatically illustrates an overall control system constructed in accordance with the present invention. As shown, a weighing apparatus 50 measures the weight of package 10 and sends a signal to a control unit 52. Weighing apparatus 50 is useful to determine whether the weight of package 10 is, within predetermined limits, what it should be. For example, dry food product, such as rice or pasta, will often constitute the bulk of the weight of package 10. If the dry food product is not present, this will be detected immediately by weighing apparatus 50.

After being weighed, each of the packages 10 will travel along conveyor 12 to apparatus 18. As described above, apparatus 18 will signal control unit 52 regarding the extent to which package 10 causes fluctuations in the magnetic field. If the particular package is found to be nonconforming, control unit 52 will send an actuation signal to ejector mechanism 20. As a result, the package will be removed from the conveyor stream.

FIG. 7 illustrates a block diagram of the electronics employed in an exemplary embodiment of apparatus 18. As shown, apparatus 18 includes field generation circuitry 54 electrically connected to one or more coils 56 of the respective coil units. Field generation circuitry 54 applies a signal to coil 56 for generating a magnetic field through which the respective packages will pass.

In this case, field generation circuitry 54 includes an oscillator 58 and a coil driver 60. Oscillator 58 generates an electrical signal of the desired frequency of the magnetic field. Coil driver 60 receives the output of oscillator 58, and applies it to the coil units. The driving frequency, which will typically fall in a range from about 10 KHz to about 100 KHz, should preferably be optimized based on the specific characteristics of the coil unit and the packages to be detected. Coil driver 60 prevents the varying impedance of the coil unit from affecting the output frequency of oscillator 58.

As shown, apparatus 18 further includes measurement circuitry 62 for measuring electrical changes in the coil units due to the metallized objects. In the illustrated embodiment, measurement circuitry 62 includes an impedance measurement device 64 and an output driver 66.

Measurement circuitry 62 continuously measures impedance changes in the coil due to the generation of eddy currents in the metallized objects. Preferably, measurement circuitry 62 should respond rapidly to the change in impedance produced in the coils. Toward this end, numerous methods may be used. One example is an electronic bridge technique as used in proximity sensors. This technique generally requires a constant frequency, but high frequencies can be used. Another detection circuit is the Colpits oscillator which is often used in commercial metal detectors. Since the frequency in the absence of metal is fairly low, and the presence of metal is detected by a frequency shift, the response tends to be slow. By using a higher frequency, the Colpits oscillator can be made to respond more rapidly.

Output driver 66 scales the output of impedance measurement device 64 to a convenient form for transmission to the control system. For example, output driver 66 may produce an output in the range of 0–10V or 4–20 ma, thus conforming to accepted industry standards. As described above, control unit 60 takes a continuous signal from the output driver 66 and determines whether the package is conforming or nonconforming to predetermined requirements.

An example of a continuous output signal 68 from output driver 66 is depicted in FIG. 8. As can be seen, it has been predetermined that an output of less than about 8.270V (represented by line 70) corresponds to more than two foil seasoning packets. Fewer than two foil packets are present if the output is more than about 8.285V (represented by line 72). Output voltages between these thresholds correspond to exactly two foil packets.

Each of the substantial peaks in signal 68 corresponds to the passage of one package 10. As can be seen, this example recorded four packages of greater than two packets, as shown by the peaks 74. Exactly two packets were also noted in four packages, as indicated by the peaks 76. The remainder of the packages each contained fewer than two packets. While a negative peak was used in this example to note the presence of metallized objects, this is merely a matter of convention. It should be understood that positive peaks may also be used in accordance with the present invention to determine the presence or absence of various metallized objects.

While preferred embodiments of the invention have been shown and described, modifications and variations may be made thereto by those of ordinary skill in the art. For example, the above example used a physical detector (e.g., roller) to determine whether a package was present in apparatus 18. It should be understood, however, that the presence of a peak from an impedance measurement may also indicate the presence of a package to the system control unit.

In addition, the apparatus of the preferred embodiment operates to detect the presence or absence of the metallized object. In other embodiments, however, it is contemplated that more sophisticated analysis of the impedance information can be performed. For example, it is believed that the techniques described herein can also determine whether a metallized object is in the correct orientation in the closed package.

Accordingly, it should be understood that these and other variations of the disclosed embodiments are intended to be included within the scope of the appended claims. In addition, aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. An apparatus used in conjunction with a packaging conveyor to detect metallized objects in respective packages moving along a conveyor stream, said apparatus comprising:

a pair of coil units respectively mounted in association with the packaging conveyor such that the respective packages pass therebetween;

wherein said coil units each comprise a coil of wire wrapped about a nonferrous core;

field generation circuitry electrically connected to said coil units and operative to apply a signal thereto for generating a magnetic field through which the respective packages will pass;

said coil units being oriented with axes directed toward each other across said conveyor stream such that said packages will cut through said magnetic field; and measurement circuitry operative to measure electrical changes in said coil units due to the metallized objects and produce an output indicative thereof.

2. An apparatus as set forth in claim 1, wherein said field generation circuitry includes an oscillator and a coil driver, said coil driver operative to inhibit fluctuations in an output frequency of said oscillator due to variations in an impedance of said at least one coil unit.

3. An apparatus as set forth in claim 1, wherein said measurement device is operative to measure impedance across said at least one coil unit.

4. An apparatus as set forth in claim 1, further comprising a weighing device mounted in association with the packaging conveyor and operative to weigh the respective packages.

5. An apparatus as set forth in claim 1, further comprising a presence detector operative to sense physical presence of the respective packages adjacent to said at least one coil unit.

6. An apparatus as set forth in claim 1, further comprising output driver circuitry operative to receive said output of said measurement circuitry and produce a scaled output signal.

7. An apparatus as set forth in claim 6, further comprising:

a control system operative to receive said scaled output signal and responsively produce a control output if a nonconforming package has been detected; and an ejector mechanism operative to remove the nonconforming package from the conveyor stream.

8. An apparatus according to claim 7, wherein said ejector mechanism comprises a lateral pushing mechanism.

9. An apparatus for detection of a metallized object in a package, said apparatus comprising:

a pair of coil units mounted in parallel planes such that the packages can be passed therebetween, each of said coil units comprising a coil of wire wrapped around a nonferrous core;

field generation circuitry electrically connected to said coil units and operative to apply a signal thereto for generating a magnetic field in a region between said coil units;

said coil units being oriented with axes directed toward each other across said conveyor stream such that said packages will cut through said magnetic field;

measurement circuitry operative to measure changes in an impedance of said coil units due to the metallized object; and a presence detector operative to sense physical presence of the package between said coil units.

10. An apparatus as set forth in claim 9, wherein said field generation circuitry includes an oscillator and a coil driver.

11. An apparatus as set forth in claim 10, further comprising output driver circuitry operative to receive an output of said measurement circuitry and produce a scaled output signal.

* * * * *